Sept. 15, 1936.   B. V. GILMORE   2,054,218
WEDGE CUTTING MACHINE
Filed Oct. 15, 1934   2 Sheets-Sheet 1

Inventor
B. V. Gilmore
By A. Yates Dowell
Attorney

Sept. 15, 1936.   B. V. GILMORE   2,054,218
WEDGE CUTTING MACHINE
Filed Oct. 15, 1934   2 Sheets-Sheet 2
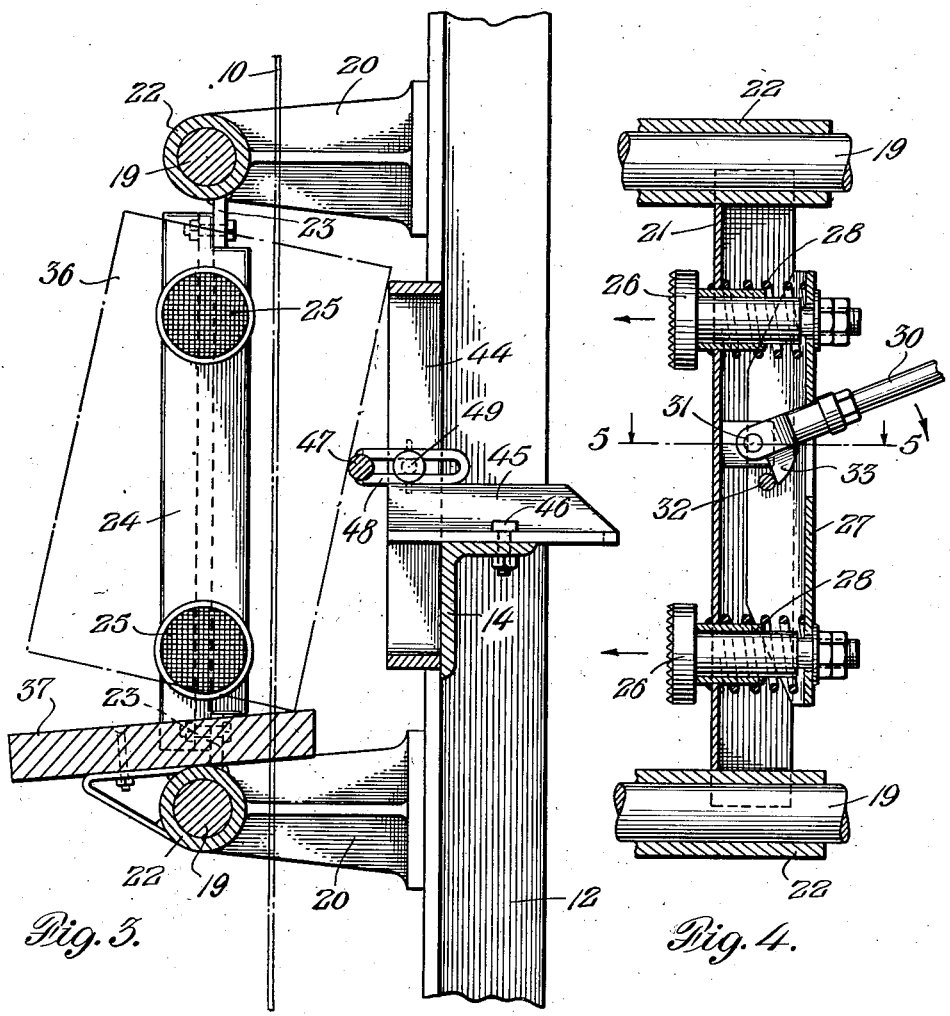
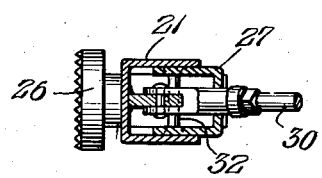

Patented Sept. 15, 1936

2,054,218

UNITED STATES PATENT OFFICE 2,054,218

WEDGE CUTTING MACHINE

Benjamin V. Gilmore, Seth, W. Va., assignor to Frick Company, Waynesboro, Pa., a corporation of Pennsylvania Application October 15, 1934, Serial No. 748,400

5 Claims. (Cl. 143—52)

This invention relates to cutting or sawing apparatus, and particularly to a machine for sawing wedges such as are used in wedging timber for mines and other purposes.

It is an object of the invention to provide an improved machine of this character which is safe and easy to operate, and which has a large capacity or output.

Another object of the invention is to provide a machine of this character which is adapted to handle material of different sizes and cut the same into blocks or wedges of any desired thickness and taper.

A further object of the invention is to provide an improved machine of this character which comprises a movable carriage or the like for supporting the work piece, said carriage being provided with clamping means adapted to hold blocks or work pieces of varying dimensions and even of non-uniform cross-section.

A further object of the invention is to provide a reciprocable carriage for supporting the work piece in a machine of this character, said carriage having a handle for manually shifting the carriage, the handle being also arranged to clamp the work piece to the carriage.

Figure 1:
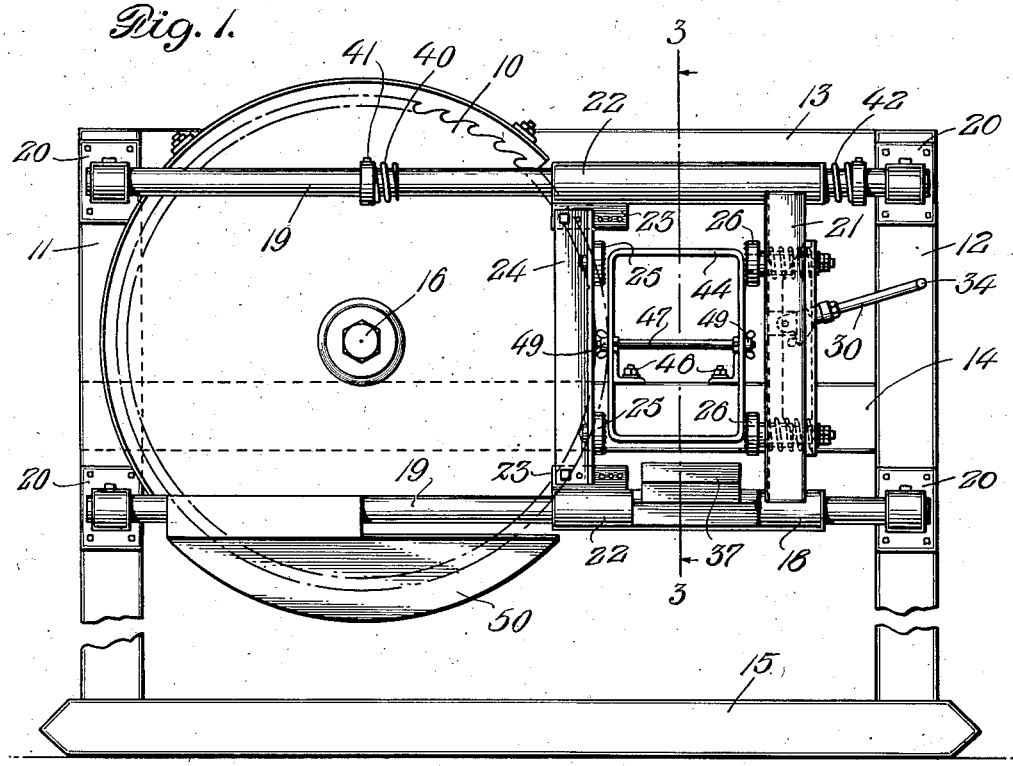
Figure 2:
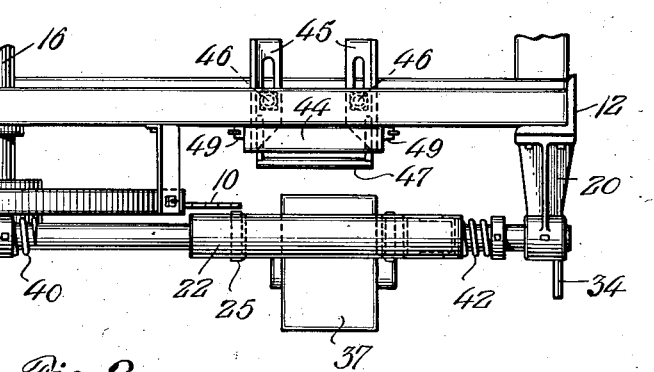

Other objects and advantages of the invention will appear from the following description of the embodiment thereof shown in the accompanying drawings wherein Fig. 1 is a side elevational view of a wedge-cutting machine embodying the invention;

Fig. 2, a plan view of the saw, gauge and reciprocable carriage shown in Fig. 1;

Fig. 3, a sectional view to an enlarged scale taken on the line 3—3 of Fig. 1;

Fig. 4, a detail view to an enlarged scale of the work-clamping device on the carriage; and Fig. 5, a detail sectional view taken on the line 5—5 of Fig. 4.

Referring to the drawings, the wedge-cutting machine illustrated comprises a vertically disposed rotary saw 10 suitably mounted in a frame or table comprising the vertical frame members 11 and 12 and cross frame members 13, 14 and 15. The frame may be constructed of angle irons and bars welded or riveted together as shown but the details of the frame construction form no part of the present invention. The saw 10 is carried by a mandrel 16, preferably mounted in ball bearings secured to the cross frame members 14. A pulley (not shown) may be mounted upon the outer end of the mandrel 16 as is customary in rotary saws.

The present machine is designed for the purpose of cutting wedges or prismatic blocks of any desired taper and thickness from wooden slabs, although certain features of the invention may be adapted for other purposes. In its preferred form, the machine comprises a vertically disposed reciprocable carriage 18 which is carried by two parallel guide bars or shafts 19 extending parallel to the saw 10, which are in turn supported by horizontal brackets 20 on the vertical frame members 11 and 12. The carriage 18 consists of a vertical frame member 21 and horizontal extensions or sleeves 22 adapted to encircle the guide bars 19. The extensions 22 are provided with perforated lugs 23 which may be welded thereto. An adjustable frame member or bar 24 is adapted to form the left-hand side of the carriage as shown in Fig. 1, the member 24 being bolted to the lugs 23. The member 24 may be provided with knurled clamping heads 25 adapted to engage the work piece. It will be apparent that by clamping the member 24 in different positions upon the lugs 23, the carriage is adapted to handle slabs or blocks of different thicknesses.

The frame member 21, as shown more clearly in Figs. 4 and 5, is provided with reciprocable clamping heads 26 adapted to be moved to engage the work piece and securely hold the same in the carriage 18. A cross-bar 27 connects the rear ends of the clamping heads 26, the heads being shown as bolted to said cross-bar. Resilient means such as the coiled springs 28 are provided for retracting the clamping heads 26.

In order to control the clamping heads 26, a lever 30 pivoted at 31 to the carriage is provided. The lever 30 is arranged to engage the cross-bar 27 whereby when the lever is rocked on the pivot 31, the clamping heads 26 are projected to engage the work and clamp the same against the opposite knurled heads 25. For the purposes of illustration, the cross-bar 27 is shown as provided with a pin 32 adapted to be engaged by a cam portion 33 of the clamping lever 30. The clamping lever 30 is further provided with an outwardly extending or angular portion 34 forming a handle accessible to the operator of the machine standing in front of the table alongside of the saw where the work piece may be conveniently inserted into the carriage 18.

It will be apparent further that the springs 28 not only serve to retract the clamping heads 26 upon release of the clamping lever 30 but also permit the use of slabs or blocks of non-uniform cross-section or width, as such pieces may be firmly clamped between the heads 25 and 26 of the clamping device on account of the yielding or self-aligning function of the latter clamping heads. The force of the clamping lever 30 being transmitted through the pin 32 the member 27 is free to assume an inclined position when a slab of irregular shape is encountered.

The clamping lever 30 serves the dual purpose of controlling the clamping of the work piece and the shifting of the carriage in relation to the saw 10 to cut the wedge. The operator standing alongside of the saw 10 inserts block or slab, indicated in dotted lines by the reference numeral 36 in Fig. 3, in the carriage 18 with the bottom thereof resting upon the table 37. With his right hand the operator grasps the extension 34 of the clamping lever 30 and depresses the same to clamp the work-piece firmly in the carriage. Then by pulling upon the handle 34, the operator moves the carriage 18 and the work-piece to the left as shown in Fig. 1, thereby cutting the wedge.

The movement of the carriage is limited by the coil spring 40 on the upper guide 19. The spring 40 may be adjusted by the clamping bolt 41 in any desired position upon the guide bar 19 and serves to absorb the shock at the end of the stroke of the carriage. A similar spring 42 is provided for absorbing the shock at the other end of the stroke.

In order to gauge the thickness of the wedges to be cut, a rectangular gauge frame 44 is provided, said frame having rearwardly extending slotted leg members or brackets 45. The position of the gauge frame 44 in respect to the plane of the saw 10 may be adjusted by loosening the clamping bolts 46 by which said frame is secured to the cross member 14 of the saw frame.

In order to permit adjustment of the taper of the wedges cut by the saw, a gauge bar 47 is adjustably supported upon the vertical legs of the gauge frame 44. As shown the gauge bar 47 is provided with two slotted ears 48 which may be adjustably clamped to the gauge frame 44 by means of the clamping bolts 49. It will be apparent that by adjusting the gauge bar 47 with respect to the forward edge of the gauge frame 44, the taper of the wedges may be altered. The gauge bar 47 is disposed midway between the upper and lower cross members of the frame 44 so that the wedge may be cut alternately from the top and bottom of the work piece or slab without affecting the taper of the wedge being cut. Furthermore while the adjustments for the thickness and taper of the wedge are combined in order to simplify the construction, each of said adjustments is entirely independent insofar as the shape or dimensions of the wedge are concerned.

It will be apparent that the machine described has many desirable characteristics including simplicity, ease of operation and adjustment, and safety. The operator is in front of the table and not in line with the saw, and in handling the blocks or slabs in cutting the wedges the operator is at all times away from the saw. In inserting the work-piece in the carriage, it is unnecessary for the hand or any part of the person of the operator to be brought in line with the edge of the saw and after the work-piece is clamped on the carriage, the hand of the operator may be removed from the block which is securely held between the clamping heads.

While the preferred form of the invention comprises a vertically disposed saw and a reciprocable carriage moving parallel to the plane of the saw, it will be apparent that the relation of the saw to the carriage as well as the vertical mounting of the saw may be varied if desired. Furthermore the details of construction may be widely varied from those shown without departing from the scope of the invention as defined in the appended claims.

I claim:—

1. A wedge-cutting machine comprising a saw, a reciprocable carriage having independently adjustable clamping members thereon and a clamping lever pivoted to said carriage and having a portion serving as a handle for reciprocating the carriage, said clamping lever having a cam portion or lug for operating both of said clamping members.

2. A wedge-cutting machine comprising a saw, a reciprocable carriage in front of the saw, a gauge frame movable axially of the saw and disposed opposite said carriage when in its retracted position and a central gauge bar adjustably supported on said gauge frame.

3. A wedge-cutting machine comprising a saw, a reciprocable carriage for supporting the work piece in relation to the saw, a rectangular gauge frame disposed opposite the carriage when the same is withdrawn from the saw, and an adjustable cross bar on said gauge frame arranged to form with the edges of said frame a gauge for determining the taper of the wedge to be cut from said work-piece.

4. In a machine of the type described, a saw and a manually reciprocable carriage for presenting work pieces to the saw, work-clamping members independently and resiliently mounted in spaced relation on said carriage, a manually operable cam lever operatively associated with said clamp members for moving the same into gripping position, said clamp members being urged to retracted position upon release of said cam lever due to the resilient mounting thereof.

5. In a machine of the type specified, a saw and a manually operable carriage for presenting work pieces to the saw, work-clamping members resiliently and independently mounted for reciprocation toward and from a work piece, means connecting said clamp members, a manually actuable cam lever arranged to act on said connecting means for moving the clamping members into clamping position, said connecting means having floating connections at opposite ends thereof with said clamping members to permit the clamp members to assume positions conforming to an irregular piece of work.

BENJAMIN V. GILMORE.